United States Patent
Hoppe et al.

(10) Patent No.: US 6,269,767 B1
(45) Date of Patent: Aug. 7, 2001

(54) APPARATUS FOR APPLYING AT LEAST ONE TEAT CUP TO A TEAT OF AN ANIMAL

(75) Inventors: Friedhelm Hoppe, Wadersloh-Diestedde; Kurt Kimm, Gütersloh, both of (DE)

(73) Assignee: Westfalia Landtechnik GmbH, Oelde (DE)

( * ) Notice: Subject to any disclaimer, the term of this patent is extended or adjusted under 35 U.S.C. 154(b) by 0 days.

(21) Appl. No.: 09/481,644

(22) Filed: Jan. 12, 2000

(30) Foreign Application Priority Data

Jan. 14, 1999 (DE) ............................... 199 01 241

(51) Int. Cl.⁷ .................................................. A01J 5/007
(52) U.S. Cl. .................................... 119/14.47; 119/14.08
(58) Field of Search .............................. 119/14.47, 14.48, 119/14.02, 14.08

(56) References Cited

U.S. PATENT DOCUMENTS

| | | | |
|---|---|---|---|
| 4,872,147 | * 10/1989 | Hilhorst | 367/96 |
| 5,020,477 | * 6/1991 | Dessing et al. | 119/14.08 |
| 5,056,466 | * 10/1991 | Dessing et al. | 119/525 |
| 5,069,160 | 12/1991 | Street et al. | |
| 5,553,569 | 9/1996 | Street et al. | |
| 5,915,331 | * 6/1999 | Kimm | 119/14.08 |

FOREIGN PATENT DOCUMENTS

| | | |
|---|---|---|
| 0 188 303 | 7/1986 | (EP) . |
| 0 191 517 | 8/1986 | (EP) . |
| 0 258 938 | 3/1988 | (EP) . |
| 0 300 115 | 1/1989 | (EP) . |
| 0 551 960 | 7/1993 | (EP) . |
| 0 630 564 | 12/1994 | (EP) . |
| 0 692 187 | 1/1996 | (EP) . |
| 90/07268 | 7/1990 | (WO) . |
| 92/06588 | 4/1992 | (WO) . |

\* cited by examiner

*Primary Examiner*—Charles T. Jordan
*Assistant Examiner*—Yvonne R. Abbott
(74) *Attorney, Agent, or Firm*—Alston & Bird LLP

(57) ABSTRACT

An apparatus for applying at least one teat cup (1) to a teat (2) of an animal (3), which includes a sensor arrangement (5) which has at least one sensor unit (6) that can be brought into contact with a rear body part of the animal (3). To apply a teat cup, an application device (14) is provided, which comprises at least one positioning arm (15) for applying the at least one teat cup (1) to the teat (2) of the animal (3). The application device is coupled with a controller, which connects to a positioning device. The sensor arrangement (5) comprises a measuring device (9) connected to the sensor unit (6). The sensor arrangement (5) is stationarily arranged with respect to a reference position. The sensor unit (6) is designed and constructed such that it follows the movement of the animal (3), and the measuring device (9) measures the change of position of the sensor unit (6) with respect to the reference position. The measuring device connects to an evaluation unit of a controller, so that the data obtained by the measuring device are used for a coarse positioning of the positioning arm (15).

14 Claims, 2 Drawing Sheets

APPARATUS FOR APPLYING AT LEAST ONE TEAT CUP TO A TEAT OF AN ANIMAL

BACKGROUND OF THE INVENTION

The subject matter of the present invention relates to an apparatus for applying at least one teat cup to a teat of an animal, in particular a cow.

For mechanically applying at least one teat cup to a teat of an animal, in particular a cow, a large variety of configurations of such apparatus have been developed. EP 0 300 115 B1 discloses an apparatus for applying at least one teat cup to a teat of an animal, which comprises sensors for locating the position of the teat as well as a movable positioning arm for applying at least one teat cup. The location of at least one teat occurs such that a sensor unit initially performs a coarse positioning of the positioning arm. Thereafter, additional sensors perform a fine positioning of the positioning arm. Once the teat is found, the teat cup is applied.

The sensors may be ultrasound sensors or optical sensors. Since the sensors are arranged within a reach of contamination, there is the risk that contamination reduces the sensitivity of the sensors, so that more time is required for locating a teat.

EP 0 191 517 B1, EP 0 258 938 B1, as well as EP 0 551 960 B1 disclose apparatus for applying at least one teat cup. These apparatus are intended to facilitate a coarse positioning of the positioning arm in that the freedom of movement of the animal in a milking compartment is reduced by blocking means. The animal occupies in the milking compartment a predetermined, forced position, which the animal is unable to change while at least one teat is being located. This forced position of the animal in the milking compartment may lead to a decrease in the milk output of the animal, since the animal is exposed by its forced position in the milking compartment to an increased stress situation.

EP 0 630 564 A2 discloses an apparatus for applying at least one teat cup, which comprises a sensor arrangement with at least one sensor unit adapted for contacting a rear body part of the animal. The sensor unit extends in the longitudinal direction of the milking compartment and is thus displaceable in the longitudinal direction of the animal, so that the animal is able to move inside the milking compartment. The sensor arrangement follows the movement of the animal. The positioning arm is rigidly connected to the sensor arrangement via a frame. The positioning arm is forced to follow the movement of the sensor arrangement. The sensor arrangement is arranged on a crossarm, which is adapted for swiveling about a substantially vertically extending axle. To make it possible for an animal to enter the milking compartment, it is necessary to swing the crossarm out of the milking compartment. This requires adequate space for being able to perform the swinging motion.

Based on the foregoing, it is an object of the present invention to improve the known apparatus for applying at least one teat cup such that a coarse positioning of the positioning arm is simplified.

SUMMARY OF THE INVENTION

The above and other objects and advantages of the present invention are achieved by the provision of an apparatus for applying at least one teat cup to a teat of an animal, in particular a cow, which comprises a sensor arrangement, which includes at least one sensor unit. The sensor unit is adapted for coming into contact with a rear body part of the animal. The apparatus also comprises an application device, which includes at least one positioning arm for applying at least one teat cup to a teat of the animal and a positioning device for locating at least one teat and for positioning the positioning arm. Furthermore, the apparatus comprises a controller that connects to the positioning device.

The sensor arrangement comprises a measuring device connected to the sensor unit. The sensor arrangement is stationarily arranged with respect to a reference position. However, the sensor unit is adapted for changing its position along with the movement of an animal. The measuring device measures a change of position of the sensor unit with respect to the reference position. The measuring device connects to the controller, which includes an evaluation unit. In the evaluation unit, the measurement is evaluated, which has been carried out by the measuring device. The result of the evaluation is used for a coarse positioning of the positioning arm. Between the sensor arrangement and the positioning device, in particular the positioning arm, there is no mechanical connection, so that the sensor unit is movable independently of the positioning arm. Contrary to the disclosure of EP 0 630 564 A2, it is thus made possible to realize a greater capability of the sensor unit responding to possible movements of the animal. Since the positioning arm does not mechanically connect to the sensor unit, lesser masses are to be moved.

According to an advantageous embodiment of the apparatus according to the invention, it is proposed to adapt the sensor unit for pivoting movement about an axle. Preferably, the sensor unit is pivoted about a substantially horizontally extending axis which is defined by the axle. In this connection, the substantially horizontally extending axis is arranged preferably such that it is located at a distance spaced above the floor. With this arrangement, it is also accomplished that dirt-sensitive parts of this sensor arrangement are arranged outside of the reach of dirt. The fact that the axis extends horizontally and at a distance above the floor simplifies access of an animal to a milking compartment, since it is possible to swing the sensor arrangement upward out of the milking compartment, thereby reducing likewise the space requirement. In addition to a horizontally extending axis, the sensor unit may also be adapted for pivoting about a substantially vertically extending axis, thereby permitting further improvement in the accuracy of the coarse positioning of the animal within a milking compartment.

Preferably, the apparatus of the present invention is constructed with a sensor unit that comprises at least one substantially bar-shaped scanning element. Preferred, however, is an apparatus, wherein the sensor unit is formed by a U-shaped bracket. The U-shaped bracket ensures that the sensor unit can also be reliably brought into contact with a rear body part of the animal. The U-shaped bracket also permits transmitting in a relatively simple manner a deflection of the sensor unit about a substantially vertically extending axis.

According to a yet further advantageous embodiment of the apparatus, it is proposed to provide the bracket with legs, which connect to the axle. Preferably, the legs are constructed substantially parallel to each other. The spacing between the legs is smaller than an inside width of a milking compartment.

The measuring device preferably is an angle measuring instrument, which measures a deflection of the sensor unit about the pivoted axis. Preferably, the angle measuring device is a digitally operating angle measuring instrument, so that the digital signals of the angle measuring instrument can be supplied to the evaluation unit of the controller. In the evaluation unit, the relative position of the animal with respect to the reference position is determined on the basis of the measured deflection of the sensor unit.

The measuring device may also be a displacement measuring device, which measures a distance, by which the sensor unit is deflected from the reference position. The displacement measuring device may be, for example, an inductively operating displacement measuring device.

According to a yet further advantageous embodiment of the apparatus, it is proposed to provide the sensor arrangement with an actuation unit, which connects to the sensor unit in such a manner that the sensor unit lies against a rear body part of the animal with a predetermined force. The force is selected such that the animal does not negatively respond to the contact of the sensor unit. The sensor unit contacts the animal under the predetermined force even during a movement of the animal.

Preferably, the actuation unit is connected to the axle. To keep the moment necessary for bringing the sensor unit into contact with a rear body part of the animal as small as possible, it is proposed to connect the actuation unit to the axle via a lever.

A hydraulically or pneumatically operating piston-cylinder unit may form the actuation unit. Preferably, the actuation unit is a pneumatically operating piston-cylinder unit. In particular, it is proposed to provide the piston-cylinder unit with a piston that can be biased on both sides by a pressure medium, so that the force, under which the sensor unit lies against the rear part of the animal body, can be kept constant during a movement of the animal.

The actuation unit may also be an electromotive unit, or it may be formed by at least one spring, preferably a tension spring, so that the sensor unit comes into contact with the rear part of the animal body.

BRIEF DESCRIPTION OF THE DRAWINGS

Further details and advantages of the apparatus for applying at least one teat cup are explained with reference to the embodiment illustrated in the drawing, in which.

DETAILED DESCRIPTION OF THE PREFERRED EMBODIMENT

Figure 1:
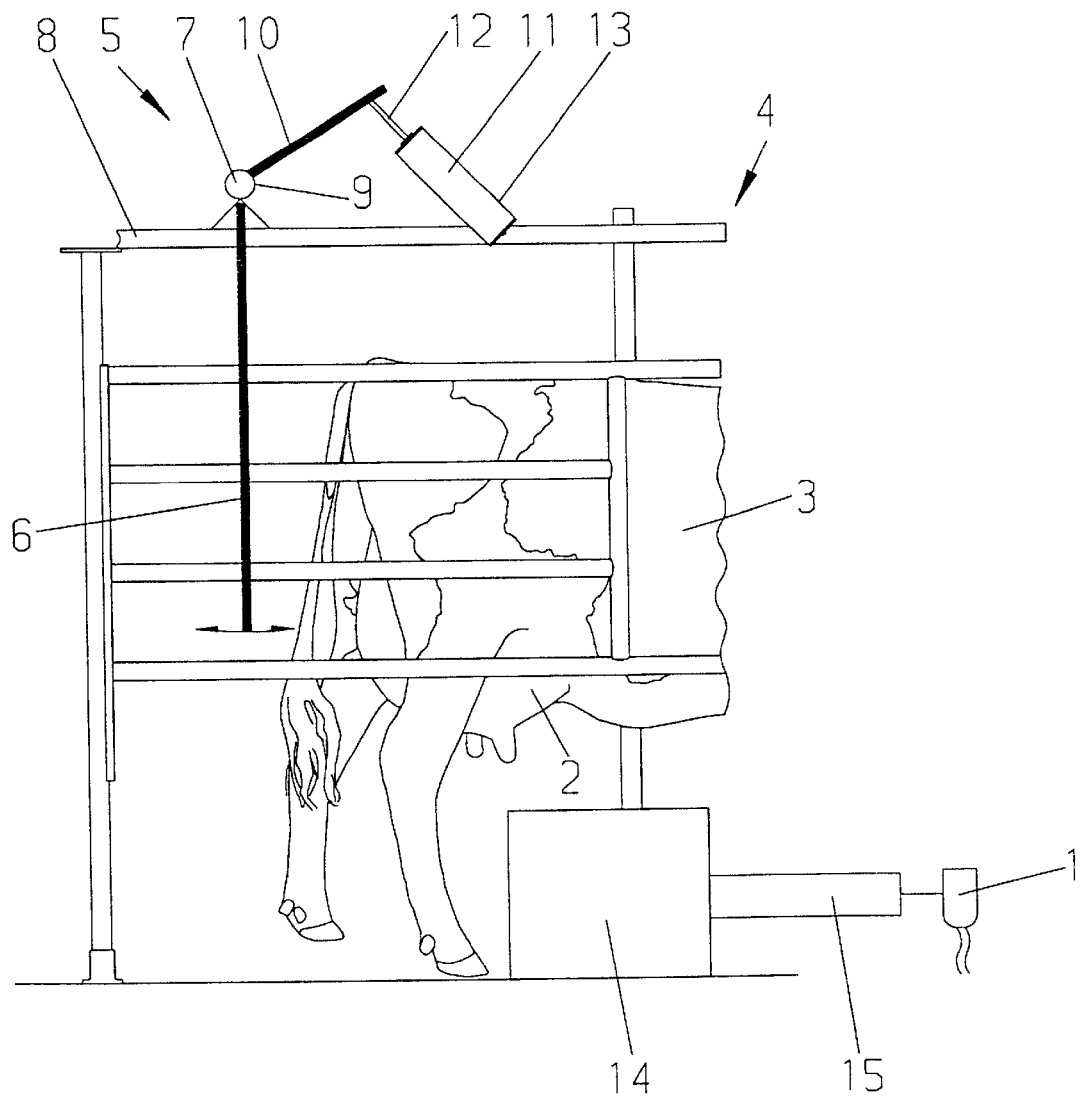
FIG. 1 is a schematic view of an apparatus for applying at least one teat cup.

FIG. 1 is a schematic view of an apparatus for applying at least one teat cup 1 to a teat 2 of an animal 3. The animal 3, which is in the illustrated embodiment a cow, is shown in a milking compartment 4. The milking compartment 4 is constructed in a manner known per se.

The apparatus comprises a sensor arrangement 5. The sensor arrangement 5 includes a sensor unit 6 that can be brought into contact with a rear body part of the animal 3. The sensor unit is adapted for pivoting about a substantially horizontally extending axis which is defined by an axle 7. The axle 7 is supported on an upper beam 8 of the compartment 4, so that the pivotal axis is above the height of the animal. The sensor unit 6 connects to a measuring device 9, which comprises an angle measuring instrument which measures a deflection of sensor unit 6 about the axis of the axle 7 with respect to a reference position. Preferably, the measuring device 9 is a digitally operating angle encoder. The measuring device 9 is arranged at an elevated location so as to be outside a reach of dirt and water.

Connected to axle 7 is a lever 10, which is engaged by an actuation device 11. In the illustrated embodiment, the actuation device 11 is a pneumatically operating piston-cylinder unit, which includes a cylinder 13 which is pivotally joined to the beam 8. A piston rod 12 extends from the cylinder 13 and connects with its free end to the lever 10. When the actuation unit is biased by a pressure medium, the sensor unit 6 will pivot via lever 10 about axle 7 in a direction towards the rear body part of animal 3. The pivoting procedure will end only, when the sensor unit 6 lies under a predetermined force against the body of animal 3. During a movement of animal 3, the actuation unit 11 will cause sensor unit 6 to follow, when the force decreases, which is operative between the sensor unit 6 and the body part of animal 3. The force, which the sensor unit 6 applies to the animal even during a movement of the animal inside the milking compartment, is preferably constant. To this end, the pressure of the medium of the piston-cylinder unit is changed in corresponding manner.

Preferably, the pressure inside the piston-cylinder unit for swinging the sensor unit out of a milking compartment may be increased such that the sensor unit can be moved out of the milking compartment relatively quickly. Also, the actuation unit may be biased in the opposite direction by the increased pressure until the sensor unit comes into contact with the animal, and thereafter it is biased by a reduced pressure.

The measuring device 9 connects by means of a control line to an application device 14. The application device 14 comprises a positioning device 17 (FIG. 2) for locating at least one teat. This positioning device performs a fine or very accurate location of the teat. The application device 14 comprises at least one positioning arm 15, which mounts the at least one teat cup 1 that is to be positioned.

Figure 2:
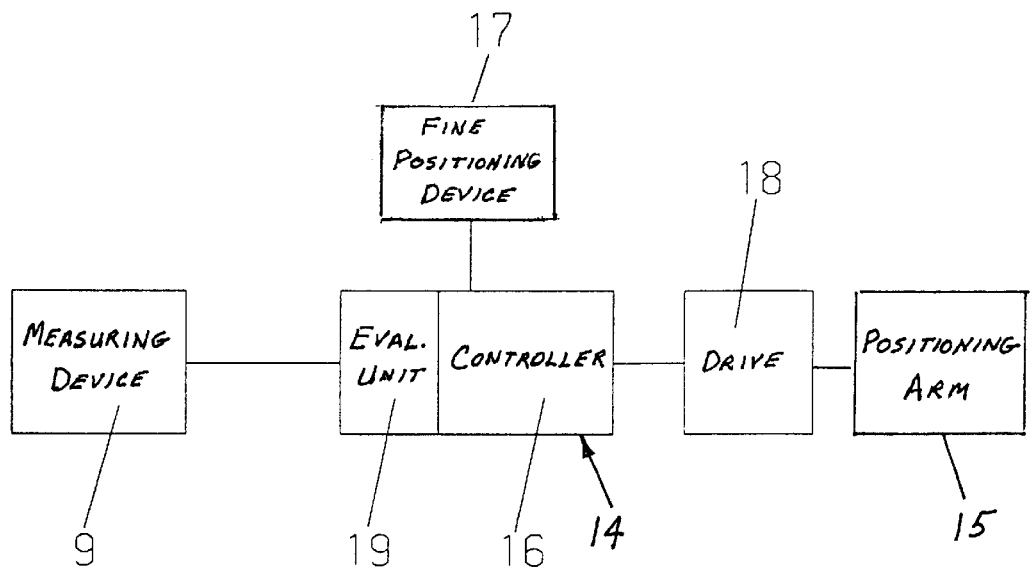
FIG. 2 is a schematic circuit diagram.

FIG. 2 is a schematic circuit diagram. The application device 14 comprises a controller 16, which serves to activate a drive 18. The drive 18 causes the positioning arm 15 to adapt to the position of the animal.

The measuring device 9 connects by means of a control line to the controller 16. The controller 16 includes an evaluation unit 19, which evaluates the results measured by measuring device 9. The measurement, which is performed by measuring device 9 may proceed continuously or within predetermined time intervals. In particular, the evaluation unit 19 determines the distance of the rear body part of animal 3 with respect to a reference position. The result of the evaluation by the evaluation unit is used for a coarse positioning of positioning arm 15. For a fine positioning of the positioning arm, the positioning device 17 is provided, which connects to controller 16.

Figure 3:
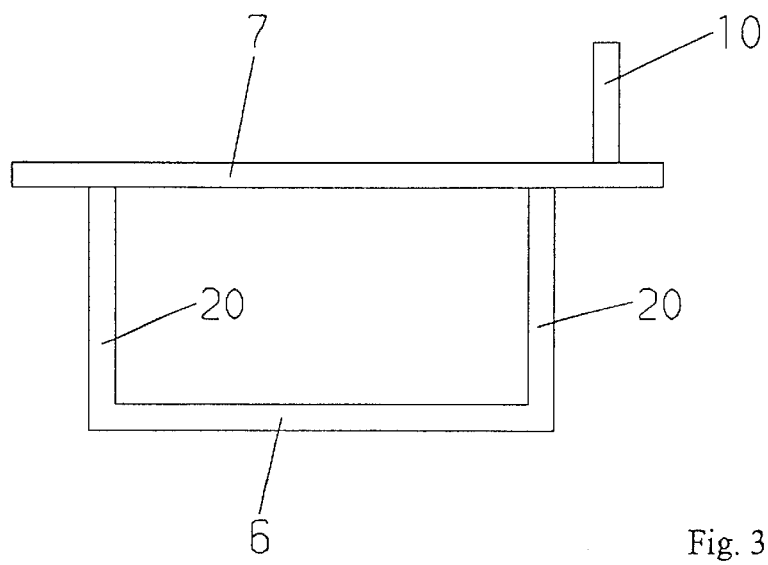
FIG. 3 shows an embodiment of a sensor unit.

FIG. 3 illustrates an embodiment of a sensor unit 6. The sensor unit 6 is in the form of a bracket having legs 20 which are connected to axle 7. The distance between the substantially parallel extending legs is smaller than the width of the milking compartment 4. The sensor unit 6 is adapted for pivoting about the horizontal axis of the axle 7, so that it opens the milking compartment 4 for the entry of an animal.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. An apparatus for applying at least one teat cup to a teat of an animal, comprising a sensor unit which is mounted so as to be able to follow the movement of the animal, a measuring device connected to the sensor unit for sensing the position of the sensor unit and thus the position of the animal with respect to a reference position and for generating an output signal which is responsive to the position of the animal to an evaluation unit, an application device which includes at least one positioning arm which mounts at least one teat cup, and a controller connected to a drive for moving the one positioning arm, with said controller being connected to said evaluation unit so that the data obtained by the measuring device are used for a coarse positioning of the positioning arm, and a fine positioning device for closely locating the at least one teat, with the fine positioning device connected to the controller so as to provide a fine positioning of the positioning arm.

2. The apparatus as defined in claim 1 wherein the measuring device comprises a displacement measuring instrument which measures the displacement of the sensor unit from the reference position.

3. The apparatus as defined in claim 1 wherein the sensor unit is mounted for pivotal movement about a stationary axis.

4. The apparatus as defined in claim 3 wherein the stationary axis is substantially horizontal.

5. The apparatus as defined in claim 4 wherein the stationary axis is located so as to be spaced above ground level and above the height of the animal.

6. The apparatus as defined in claim 5 wherein the sensor unit comprises a U-shaped bracket.

7. The apparatus as defined in claim 6 wherein the U-shaped bracket includes two horizontally spaced apart legs which are connected to an axle which is mounted along said pivotal axis.

8. The apparatus as defined in claim 3 wherein the measuring device comprises an angle measuring instrument which measures the pivotal movement of the sensor unit about the stationary axis.

9. The apparatus as defined in claim 3 further comprising an actuation unit connected to said sensor unit for biasing the sensor unit about said stationary axis and into contact with the animal under a predetermined force while permitting the sensor unit to follow a movement of the animal.

10. The apparatus as defined in claim 9 wherein the actuation unit is connected to said sensor unit by means of a lever.

11. The apparatus as defined in claim 9 wherein the actuation unit comprises a piston-cylinder unit.

12. The apparatus as defined in claim 11 wherein the piston-cylinder unit is pneumatically operated.

13. The apparatus as defined in claim 12 wherein the actuation unit is biased by a first pressure until the sensor unit comes into contact with the animal and thereafter biased by a second pressure which is less than the first pressure.

14. The apparatus as defined in claim 9 wherein the actuation unit is electromotive.

* * * * *